US010143137B2

(12) United States Patent
Craig (10) Patent No.: US 10,143,137 B2
(45) Date of Patent: Dec. 4, 2018

(54) HARVESTER WITH MULTI-ROW TOPPER (71) Applicant: Deere & Company, Moline, IL (US)

(72) Inventor: Paul I. Craig, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/155,923

(22) Filed: May 16, 2016

(65) Prior Publication Data
US 2017/0325402 A1    Nov. 16, 2017

(51) Int. Cl.
A01D 45/02 (2006.01)
A01D 47/00 (2006.01)
A01D 34/03 (2006.01)
A01D 45/10 (2006.01)
A01D 61/02 (2006.01)
A01D 34/66 (2006.01)
A01D 43/08 (2006.01)

(52) U.S. Cl.
CPC ............ *A01D 47/00* (2013.01); *A01D 34/03* (2013.01); *A01D 45/10* (2013.01); *A01D 61/02* (2013.01); *A01D 34/66* (2013.01); *A01D 43/08* (2013.01)

(58) Field of Classification Search
CPC ...... A01D 45/10; A01D 47/00; A01D 45/003; A01D 45/065
USPC ........................................................... 56/63
See application file for complete search history.

(56) References Cited

U.S. PATENT DOCUMENTS

| | | | | |
|---|---|---|---|---|
| 2,401,513 A * | 6/1946 | Schmidt | ................ | A01D 47/00 56/238 |
| 3,144,743 A * | 8/1964 | Gaunt | ................... | A01D 45/10 56/14.3 |
| 3,434,271 A * | 3/1969 | Fogels | ................... | A01D 45/10 56/13.8 |
| 3,473,308 A * | 10/1969 | Zagorski | ............... | A01D 47/00 56/63 |
| 3,596,447 A * | 8/1971 | Makeham | ............. | A01D 45/10 56/10.7 |
| 3,596,448 A * | 8/1971 | Van Buskirk | ......... | A01D 57/00 56/63 |

(Continued)

OTHER PUBLICATIONS

John Deere, "3520 Sugar Cane Harvester," specifications brochure (2013) pp. 1-16.

(Continued)

Primary Examiner — Arpad Fabian-Kovacs
(74) Attorney, Agent, or Firm — Michael Best & Friedrich LLP (57) ABSTRACT A harvester has a main frame defining a front and a rear, and an inlet for receiving first portions of a crop. The inlet is disposed proximate the front of the main frame. The harvester also includes a separator for processing the first portions, at least one outlet downstream of the separator for ejecting the processed first portions, a boom extending proximate the front of the main frame for reaching unprocessed crop, and a topper coupled to the boom for cutting second portions of the crop. The topper includes a cutter for cutting the second portions, a conveyor for receiving the second portions from the cutter, and an outlet disposed proximate the conveyor. The conveyor is configured to transport the second portions towards the outlet for ejecting the second portions towards the field.

17 Claims, 6 Drawing Sheets

(56) References Cited

U.S. PATENT DOCUMENTS

| | | | | |
|---|---|---|---|---|
| 3,599,404 | A * | 8/1971 | Fernandez | A01D 45/10 56/12.8 |
| 3,608,597 | A * | 9/1971 | Hill | A01D 45/10 241/79 |
| 3,760,569 | A * | 9/1973 | Willett | A01D 45/10 56/10.7 |
| 4,250,697 | A * | 2/1981 | Bray | A01D 47/00 171/58 |
| 4,272,947 | A * | 6/1981 | Mizzi | A01D 45/10 56/121.4 |
| 5,131,216 | A * | 7/1992 | Otten | A01D 47/00 56/121.44 |
| 5,463,856 | A * | 11/1995 | Beckwith | A01D 45/10 460/134 |
| 5,816,036 | A * | 10/1998 | Caillouet | A01D 45/10 56/14.3 |
| 5,845,472 | A | 12/1998 | Arnold | |
| 6,062,009 | A | 5/2000 | Caillouet | |
| 6,076,340 | A * | 6/2000 | Fowler | A01D 45/10 56/13.3 |
| 6,363,700 | B1 * | 4/2002 | Fowler | A01D 45/10 56/13.3 |
| 6,910,321 | B2 * | 6/2005 | Hinds | A01D 45/10 56/63 |
| 7,398,638 | B2 * | 7/2008 | Malmros | A01D 41/08 56/56 |
| 7,540,130 | B2 | 6/2009 | Coers et al. | |
| 7,681,388 | B1 * | 3/2010 | Hinds | A01D 41/1217 56/126 |
| 7,694,501 | B1 * | 4/2010 | Hinds | A01D 45/003 56/62 |
| 7,805,916 | B2 * | 10/2010 | Hinds | A01D 45/003 56/62 |
| 8,220,236 | B1 * | 7/2012 | Benner | A01D 45/003 56/63 |
| 2010/0186363 | A1 * | 7/2010 | Hinds | A01D 45/003 56/126 |

OTHER PUBLICATIONS

John Deere, "W-Series Combines, Harvest in Record Time," specifications brochure (2016) pp. 1-52.

Profi, "Two headers for Dutch combine harvestser," article (2016) 1 page, https://www/[rpfo/cp,/mews/Two-headers-for-Dutch-combine-harvester-1530620.html.

* cited by examiner

HARVESTER WITH MULTI-ROW TOPPER

BACKGROUND

The present disclosure relates to a harvester, such as a sugarcane harvester, and a topper for cutting the top of a crop before the crop is harvested into the machine. Toppers, such as sugarcane toppers, typically cut one row of crop at a time.

SUMMARY

In one aspect, the disclosure provides a harvester. The harvester has a main frame defining a front and a rear, and an inlet for receiving first portions of a crop. The inlet is disposed proximate the front of the main frame. The harvester also includes a separator for processing the first portions, at least one outlet downstream of the separator for ejecting the processed first portions, a boom extending proximate the front of the main frame for reaching un-processed crop, and a topper coupled to the boom for cutting second portions of the crop. The topper includes a cutter for cutting the second portions, a conveyor for receiving the second portions from the cutter, and an outlet disposed proximate the conveyor. The conveyor is configured to transport the second portions towards the outlet for ejecting the second portions towards the field.

In another aspect the disclosure provides a sugarcane harvester topper having a cutter for cutting the tops of the sugarcane, a conveyor for receiving the cut tops from the cutter, and an outlet disposed proximate the conveyor. The conveyor is configured to transport the cut tops towards the outlet to eject the cut tops towards the field.

In yet another aspect, the disclosure provides a harvester configured to process crops in a field and to operate in a first direction when so processing. The harvester has a main frame defining a front and a rear, a boom extending proximate the front of the main frame for reaching un-processed crop, and a topper coupled to the boom. The topper is configured to cut a top portion from the un-processed crop and convey the cut top portion in a second direction transverse to the first direction such that the cut top portion is distributed onto the field directly from the topper.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

Figure 1:
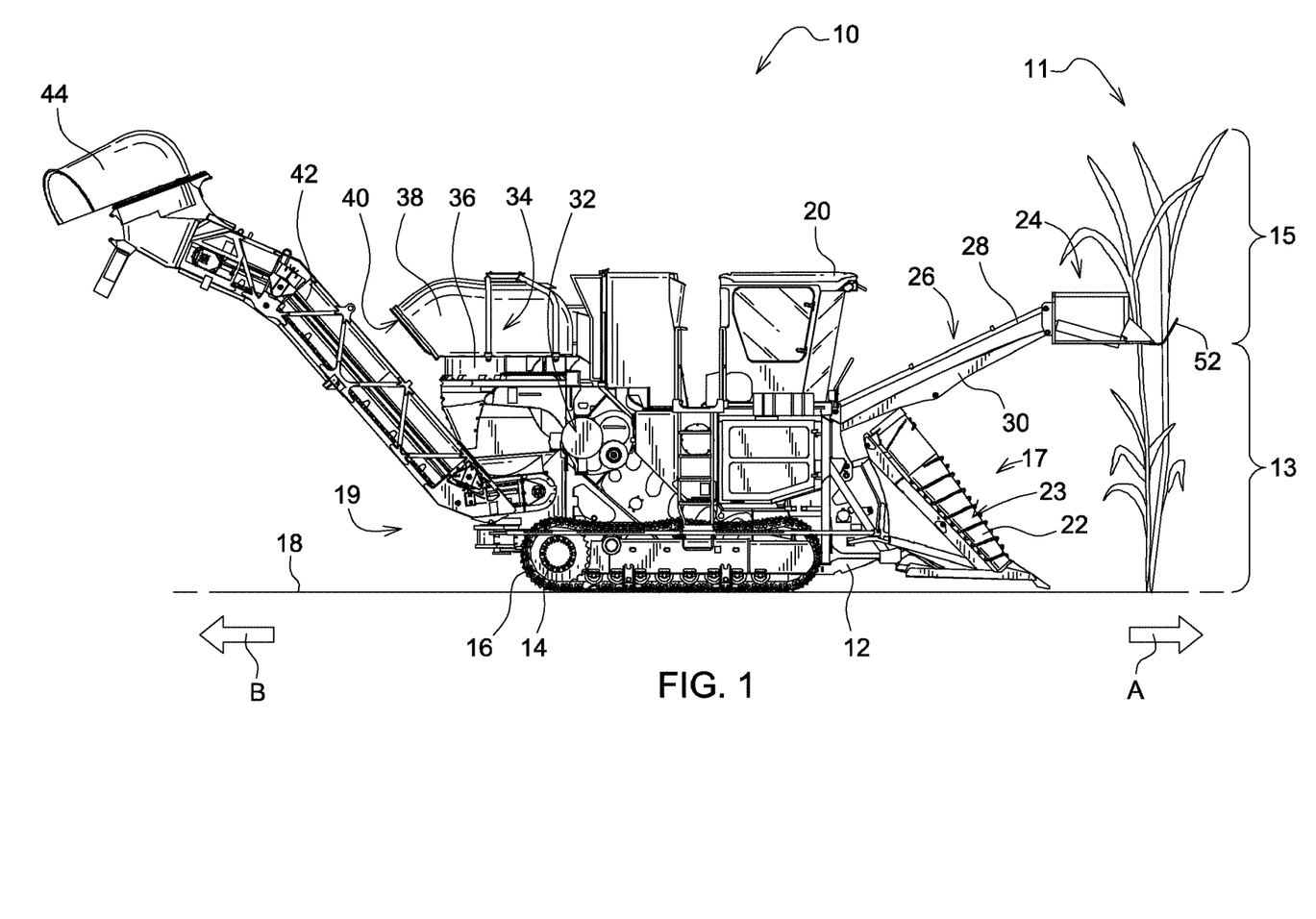
FIG. 1 is a side view of a harvester, such as a sugarcane harvester, having a multi-row topper in accordance with one implementation of the present disclosure.

FIG. 1 illustrates a harvester 10, such as a sugarcane chopper harvester, including a main frame 12 supported on wheels 14 having continuous tracks 16, tires, or other traction devices that engage a support surface 18 (e.g., the ground or field). The tracks 16 interact directly with the support surface 18 and are responsible for harvester 10 movement and tractive effort in a direction of travel, although in other embodiments the harvester 10 is provided with wheels having tires (rather than tracks as illustrated). During operation, the harvester 10 travels in a forward direction of travel A towards un-cut crop 11 in an un-harvested area of the field 18. A front 17 of the harvester 10 generally faces into the forward direction of travel A, while a rear 19 of the harvester 10 is generally opposite the front 17 and generally faces a rearward direction B, away from the forward direction A, towards a harvested area of the field 18.

An operator's cab 20 is mounted on the frame 12 and contains a seat (not shown) for an operator. A pair of crop lifters 22 having side by side augers or scrolls is mounted to the front 17 of the frame 12 and operate on opposite sides of a row of crop to be harvested. The crop lifters 22 cooperate with a base cutter (not shown) having counter-rotating discs which cut off the stalks of crop close to the support surface 18 (e.g., first portions 13 of the crop). The crop lifters 22 and the base cutter generally define an inlet 23 for receiving the crop into the harvester 10 for processing, as will be described below. A topper 24, which will also be described in greater detail below, extends from the front 17 of the frame 12 on a boom 26. The boom 26 extends forwardly from the front 17 of the frame 12 and includes a first arm 28 and a second arm 30.

The harvester 10 also includes a chopper 32 and a separator 34. The chopper 32 cuts the crop inside the harvester 10, and the separator 34 receives the cut crop from the chopper 32 and generally separates the cut crop.

The chopper 32 may include counter-rotating drum cutters (not shown) with overlapping blades for cutting stalks of crop, such as sugarcane, into billets, which are cut pieces of the stalk. In other constructions, the chopper 32 may include any suitable blade or blades for cutting the stalks of crop. In general, the crop may include sugarcane or any other type of plant, and the cut crop may include billets and extraneous leafy matter. The chopper 32 directs a stream of the cut crop (cut stalks, or billets, along with cut extraneous plant matter) to the separator 34.

The separator 34, which is coupled to the frame 12 and located downstream of the crop lifters 22 and the chopper 32 for receiving cut crop from the chopper 32, may include any combination of one or more of a cleaning chamber 36, a primary extractor fan (not shown) for facilitating separation of the crop (e.g., the leafy matter from the billets), a motor (not shown) driving the primary extractor fan, and a hood 38 for directing and discharging a portion of the separated crop (e.g., extraneous leafy matter) onto the field 18.

The hood 38 has a domed shape, or other suitable shape, and includes an opening 40 angled out from the harvester 10 and facing slightly down onto the field 18. The hood 38 directs cut crop through the opening 40 to the outside of the harvester 10, e.g., for discharging a portion of cut crop, separated or removed from the stream of cut crop, onto the field.

An elevator 42 is coupled to the frame 12 for receiving cleaned crop from the separator 34. The elevator 42 terminates at a discharge 44 elevated to a height suitable for discharging cleaned crop into a collection receptacle of a vehicle (not shown), such as a truck, wagon, or the like following alongside the harvester 10.

The harvester 10 may also include a controller 50 (FIG. 6), as will be described in greater detail below, having a user interface (not shown) for accepting inputs from the operator, e.g., for controlling various machine functions such as operation of the separator 34, the elevator 42, the first and second arms 28, 30 of the boom 26, the topper 24, etc.

Figure 2:
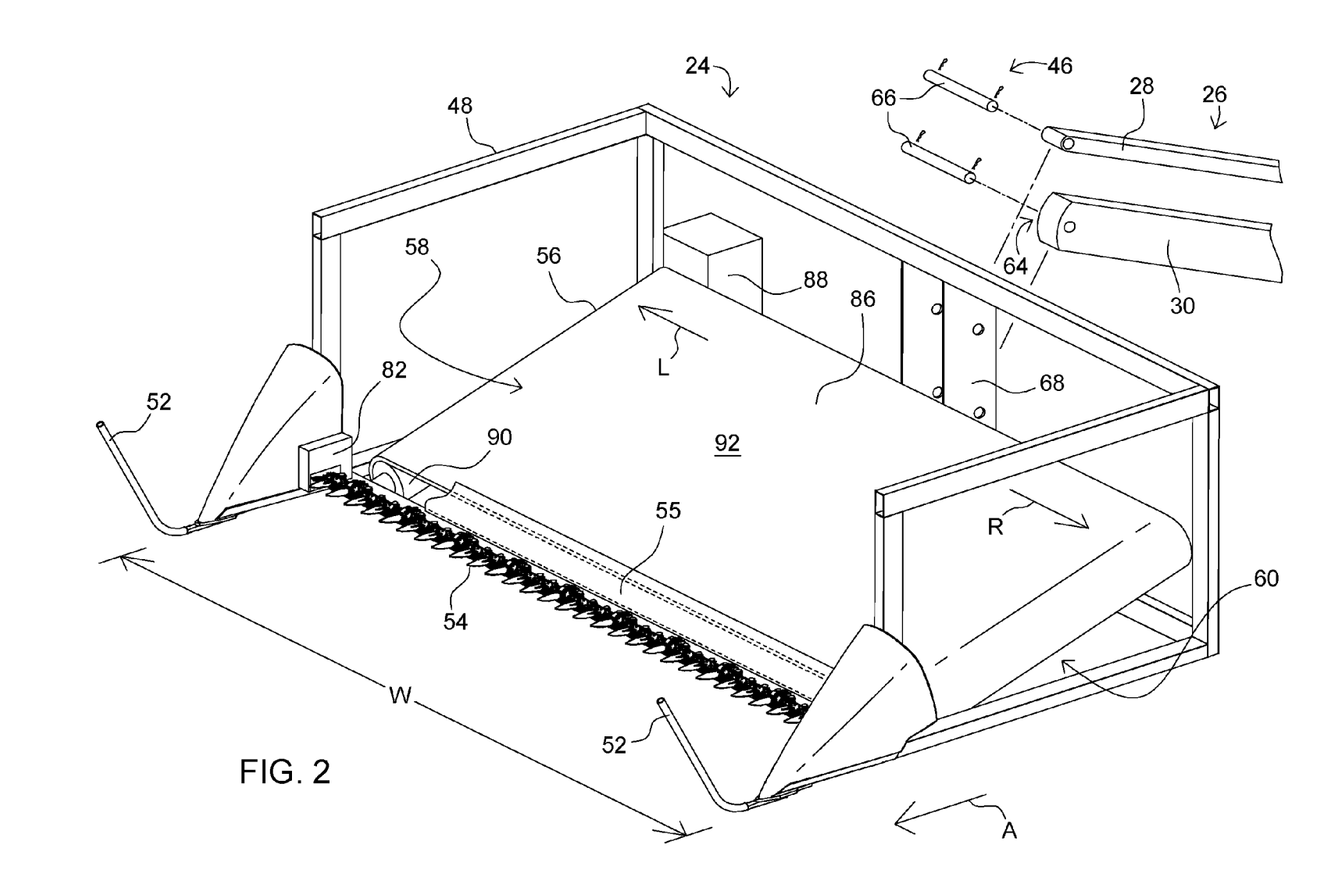
FIG. 2 is a perspective view of the multi-row topper of FIG. 1 shown disconnected from the harvester.
Figure 3:
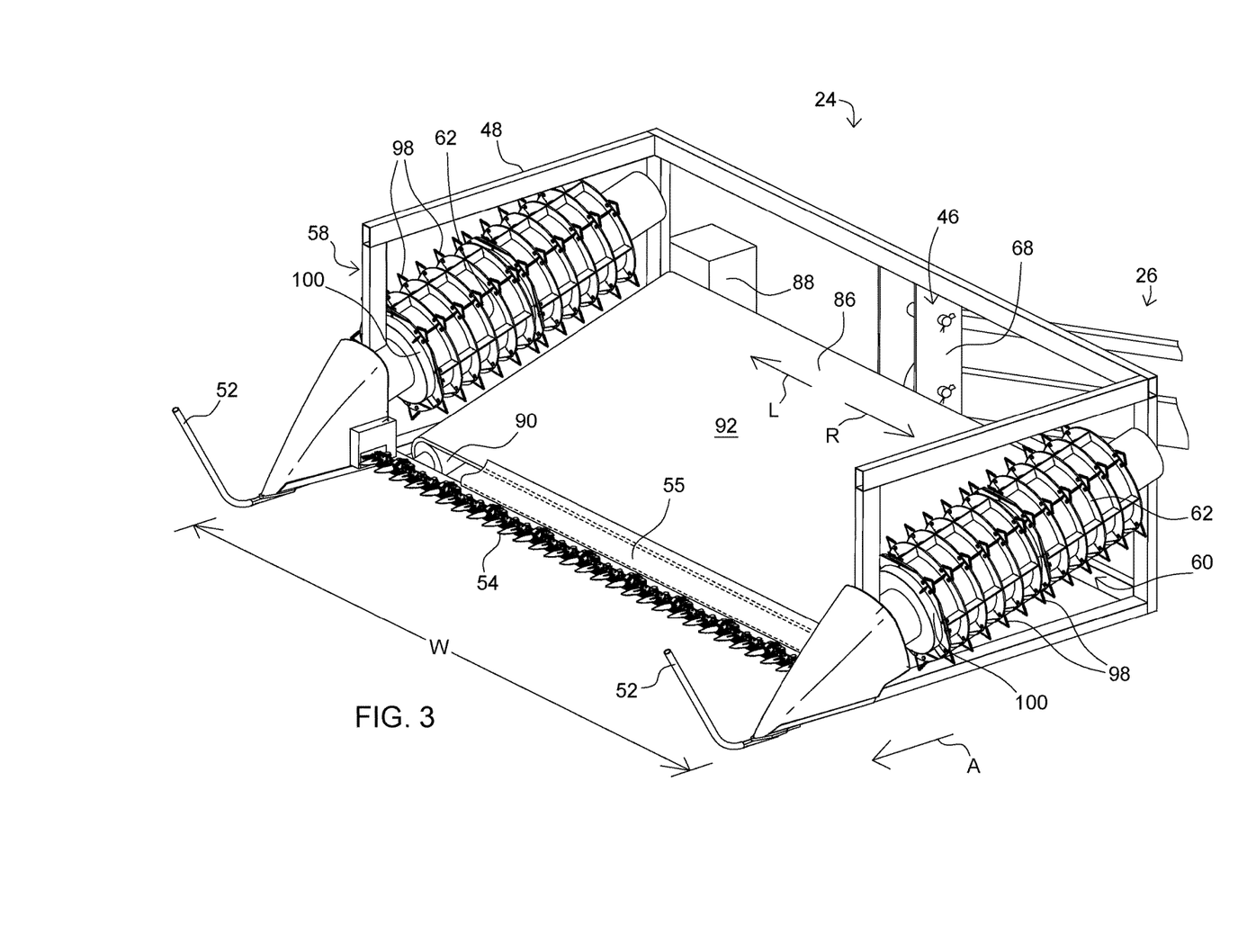
FIG. 3 is a perspective view of the multi-row topper of FIG. 1 shown connected to the harvester and having shredders.
Figure 4:
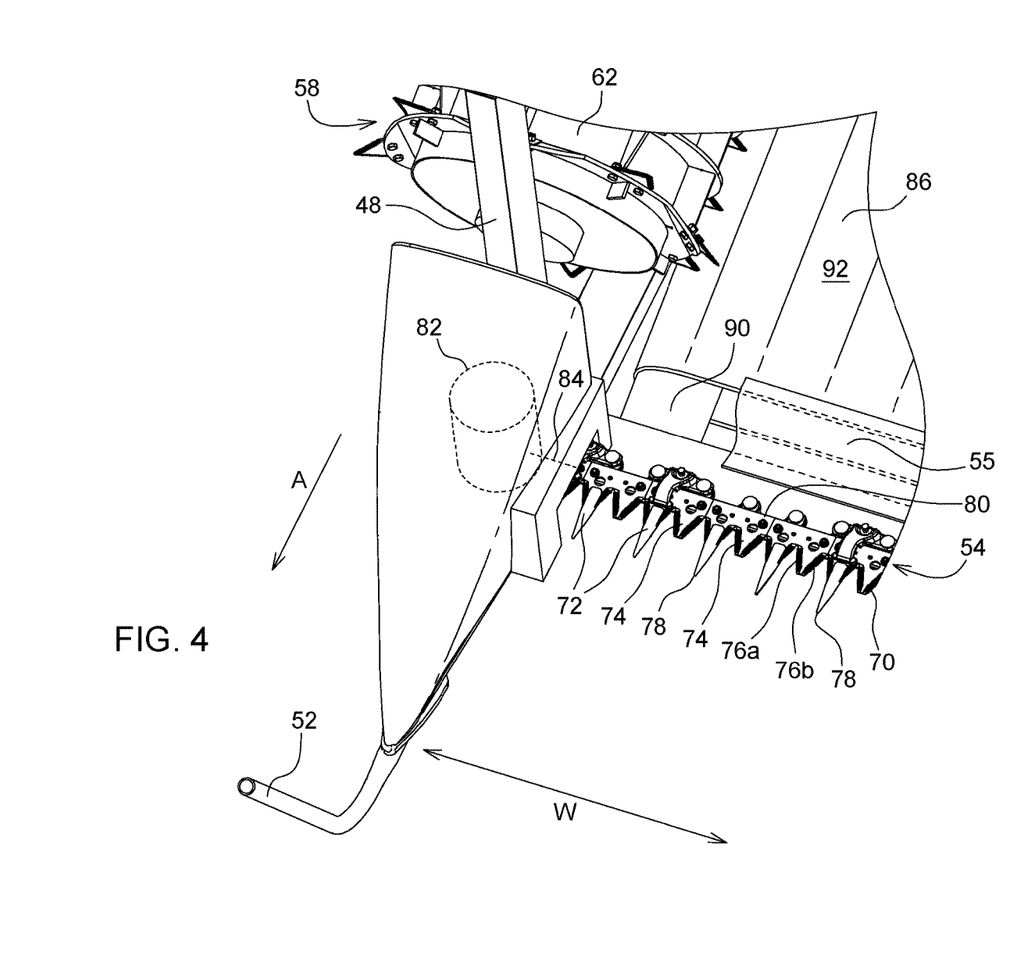
FIG. 4 is an enlarged view of a portion of the multi-row topper of FIG. 3.

FIGS. 2-4 illustrate the topper 24 in accordance with the present disclosure. The topper 24 is a multi-row topper having a width extending in a width direction W generally parallel to the field 18 and generally perpendicular to the forward direction A. The width of the topper 24 is wide enough to span at least two rows of crop, the actual size of which may vary depending on the desired application, e.g., depending on the type of crop, the spacing of the rows, etc.

The topper 24 may include a hitch 46, a frame 48, guide members 52, a cutter 54, a transition member 55, a conveyor 56, first and second outlets 58, 60, and shredders 62. The topper 24 is removably connected to the boom 26 between a disconnected position and a connected position by way of the hitch 46, e.g., proximate a front end 64 of the boom 26 (FIG. 2), or at another location on the boom 26. In the disconnected position, shown in FIG. 2, the topper 24 is mechanically separated from the boom 26, e.g., for maintenance, for changing between different types of toppers, etc. In the connected position, shown in FIGS. 1 and 3, the topper 24 is secured for operation. The hitch 46 may include any suitable releasable fastener, such as one or more linchpins, one or more links, one or more connectors, one or more fasteners, a drawbar, etc. For example, the hitch 46 may include a three-point hitch. In the illustrated construction, the hitch 46 removably couples a connection region 68 of the frame 48 to the boom 26 by way of at least two pins 66.

Generally, the frame 48 provides a connection region 68 for removably coupling the topper 24 to the boom 26 by way of the hitch 46, as discussed above. The frame 48 can be formed from any suitable material and configured in any suitable arrangement to provide the connection region 68 and to generally support the components of the topper 24. In the illustrated construction, the frame 48 is generally rectangular, or parallelepiped, but may have any suitable shape, and is formed from metal tubes. In other constructions, the frame 48 can be formed from other tubes, bars, angles, beams, plates, sheets, grating, etc. having any shape, formed from any material, and joined together in any fashion.

The guide members 52 are supported by and extend from the front of the frame 48 in a generally cantilevered fashion (as illustrated), or in any other suitable fashion, and provide visual guides to the operator for positioning the topper 24 with respect to the rows of crop being cut. The guide members 52 may include rods or other suitable guiding structure. The guide members 52 are disposed proximate ends of the frame 48 in the width direction W.

The cutter 54 is supported by the frame 48 and extends generally in the width direction W. In the illustrated construction, the cutter 54 is disposed proximate the front of the frame 48 (in the direction A), and may be disposed at the ultimate front of the harvester 10, for cutting the tops off the crop (e.g., second portions of crop 15) before the first portion of the crop 13 enters the crop lifters 22 as the harvester 10 moves forward through the field 18. The cutter 54 includes at least one blade 70 for cutting the crop. The blade(s) 70 may be powered for movement to cut the crop, e.g., the blade(s) 70 may be configured to move in a reciprocating fashion, to rotate, to pivot, to rock, etc. For example, the cutter 54 may include a sickle bar, a shears, a trimmer, etc. Thus, the blades 70 may be arranged similarly to a cutter on a combine, a hair trimmer or shears, a hedge trimmer, etc. In the illustrated construction, the cutter 54 includes a sickle bar having fingers 72 and teeth 74, as shown in greater detail in FIG. 4. The teeth 74 are generally triangular in profile, or any other suitable shape, and include generally opposing sharp cutting edges 76a, 76b. The teeth 74 are disposed on and extend from an elongated bar 80. The fingers 72 each include a pointed tip 78 extending further than the teeth 74. The fingers 72 may be stationary, and the teeth 74 may reciprocate with respect to the fingers 72 to cut the crop. In other constructions, the fingers 72 may additionally or alternatively be powered to reciprocate. For example, the fingers 72 may reciprocate 180 degrees out of phase with respect to the elongated bar 80. The elongated bar 80 (and/or the fingers 72) may be powered to reciprocate by one or more motors 82 by way of a mechanical linkage 84, shown schematically in FIG. 4. The motor 82 may be electric, hydraulic, pneumatic, a prime mover, an engine, or any other suitable type of motor.

Figure 5:
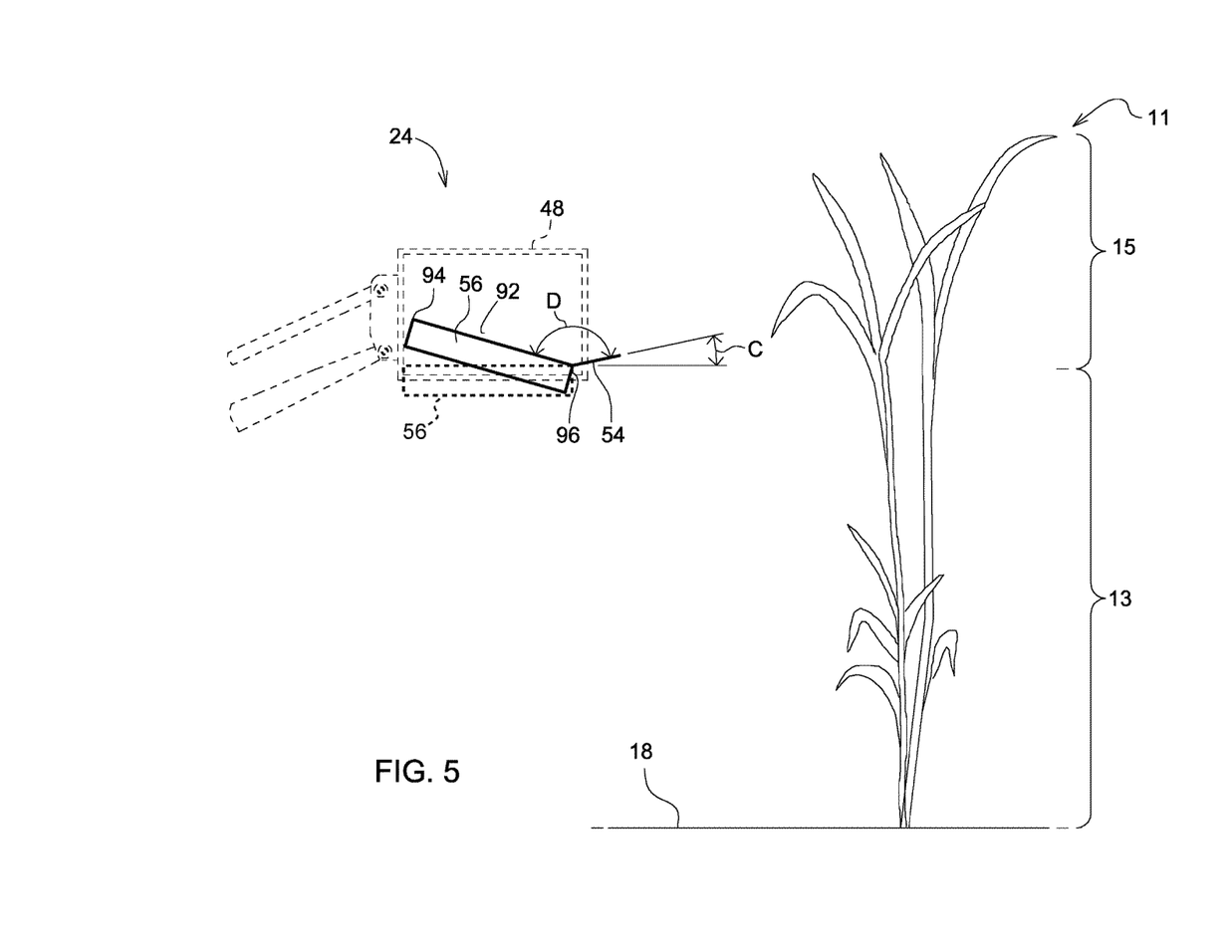
FIG. 5 is a schematic illustration of the multi-row topper of FIG. 1.

The cutter 54 generally defines an angle C with respect to the field 18, which is illustrated schematically in FIG. 5. The cutter 54 may be adjustably mounted to the frame 48 such that the angle C can be changed by tilting the cutter 54 with respect to the frame 48. Specifically, the cutter 54 may be angled towards or away from the field 18, e.g., to a negative or positive angle. Furthermore, the cutter 54 may be disposed generally parallel with the field 18 to cut the crop generally perpendicular to the stalk. Furthermore, the entire topper 24 may be adjustably mounted to the boom 26 to adjust the angle C of the cutter 54. For example, the hitch 46 may include an adjustable hinge (not shown) for changing the angle C of the cutter 54 with respect to the field 18.

Referring again to FIG. 2, the conveyor 56 is disposed generally behind the cutter 54 for receiving cut crop from the cutter 54. The transition member 55, shown in FIGS. 2-4, is disposed between the cutter 54 and the conveyor 56 for guiding the cut crop from the cutter 54 to the conveyor 56. The transition member 55 generally covers a gap between the cutter 54 and the conveyor 56 and may be formed, for example, from a metal, such as steel. Other materials, such as other metals or a plastic, may also be employed. The transition member 55 may be generally planar and formed as a sheet, a bar, etc., and may extend some or all of the width of the cutter 54 and/or the conveyor 56. The transition member 55 is shown with a cut-out in FIGS. 2-4 to illustrate other parts of the topper 24. The transition member 55 may be fixed to the frame 48 or other stationary component of the topper 24.

The conveyor 56 extends generally transverse to the direction of travel A, e.g., in the width direction W, for conveying the cut crop. The conveyor 56 may be reversibly driven to convey the cut crop in a first direction, e.g., left L, or a second direction, e.g. right R, along the width direction W. For example, the conveyor 56 may include a continuous loop belt 86. The conveyor 56 may be driven by a motor 88, which may be electric, hydraulic, pneumatic, a prime mover, an engine, or any other suitable type of motor. In some constructions, the cutter 54 and the conveyor 56 may be driven by the same motor. In the illustrated construction, the conveyor 56 is coupled to the motor 88 by a friction drive including rollers 90 (one of which is shown in FIGS. 2-3).

In other constructions, the conveyor 56 may be coupled to the motor 88 by any suitable type of drive.

As shown best in FIGS. 1 and 2 and illustrated schematically in FIG. 5, the conveyor 56 may define a generally planar surface 92 for receiving the cut crop from the cutter 54. The planar surface 92 may be disposed at an angle D (FIG. 5) with respect to the cutter 54 such that a rear edge 94 of the planar surface 92 is elevated with respect to the cutter 54, the cutter 54 being disposed proximate a front edge 96 of the planar surface 92. The orientation of the conveyor 56 may be adjustable for a user to adjust the angle D of the planar surface 92 with respect to the cutter 54, or, in other words, to adjust the elevation of the rear edge 94 with respect to the cutter 54. For example, the belt 86 and/or the cutter 54 may be adjustable to allow the user to modify the angles C and D to encourage the cut crop to fall on the planar surface 92 in an orderly fashion.

The outlets 58, 60 are disposed in any suitable location for discharging the cut crop onto the field 18. In the illustrated construction, the topper 24 includes two outlets 58, 60, which are disposed proximate opposite ends of the topper 24 (in the width direction W). The topper 24 may include one, two, three, or more outlets for discharging the cut crop. In the illustrated construction, the outlets 58, 60 are disposed proximate each end of the conveyor 56 in a direction of movement of the conveyor, e.g., in the width direction W or other direction that is transverse to the direction of travel A. Thus, the conveyor 56 is configured to convey the cut crop towards the outlet 58 when operating in a first direction (e.g., left L) and towards the outlet 60 when operating in a second direction (e.g., right R) generally opposite the first direction. The outlets 58, 60 may be defined by an opening, gap, aperture, space, etc., in any component of the topper 24, such as the frame, or may simply be defined by a respective end of the conveyor 56 or other component. The outlets 58 allow the cut crop to exit the topper 24 towards the field 18, preferably generally to the side of the harvester 10, i.e., laterally from the harvester 10 relative to the direction A during operation. The cut crop may drop from the conveyor 56 towards the field 18, as will be described in greater detail below.

The shredders 62, illustrated in FIG. 3, may be disposed proximate the outlets 58, 60. In some constructions, the topper 24 includes one, two, three, or more shredders 62, which may or may not correspond to the number of outlets. In other constructions, the topper 24 need not include the shredders 62 at all, or may include a shredder 62 at only some of the openings 58, 60. The shredders 62 each include at least one blade for further cutting the cut crop. In the illustrated construction, the shredders 62 include a rotating drum 100 having a plurality of blades 98. The plurality of blades 98 are arranged about the periphery of the drum 100, i.e., circumferentially. The shredders 62 may be powered for moving (e.g., rotating, reciprocating, etc.) the at least one blade 98 by a dedicated motor or by one of the motors 82, 88 driving the cutter 54 or the conveyor 56.

Figure 6:
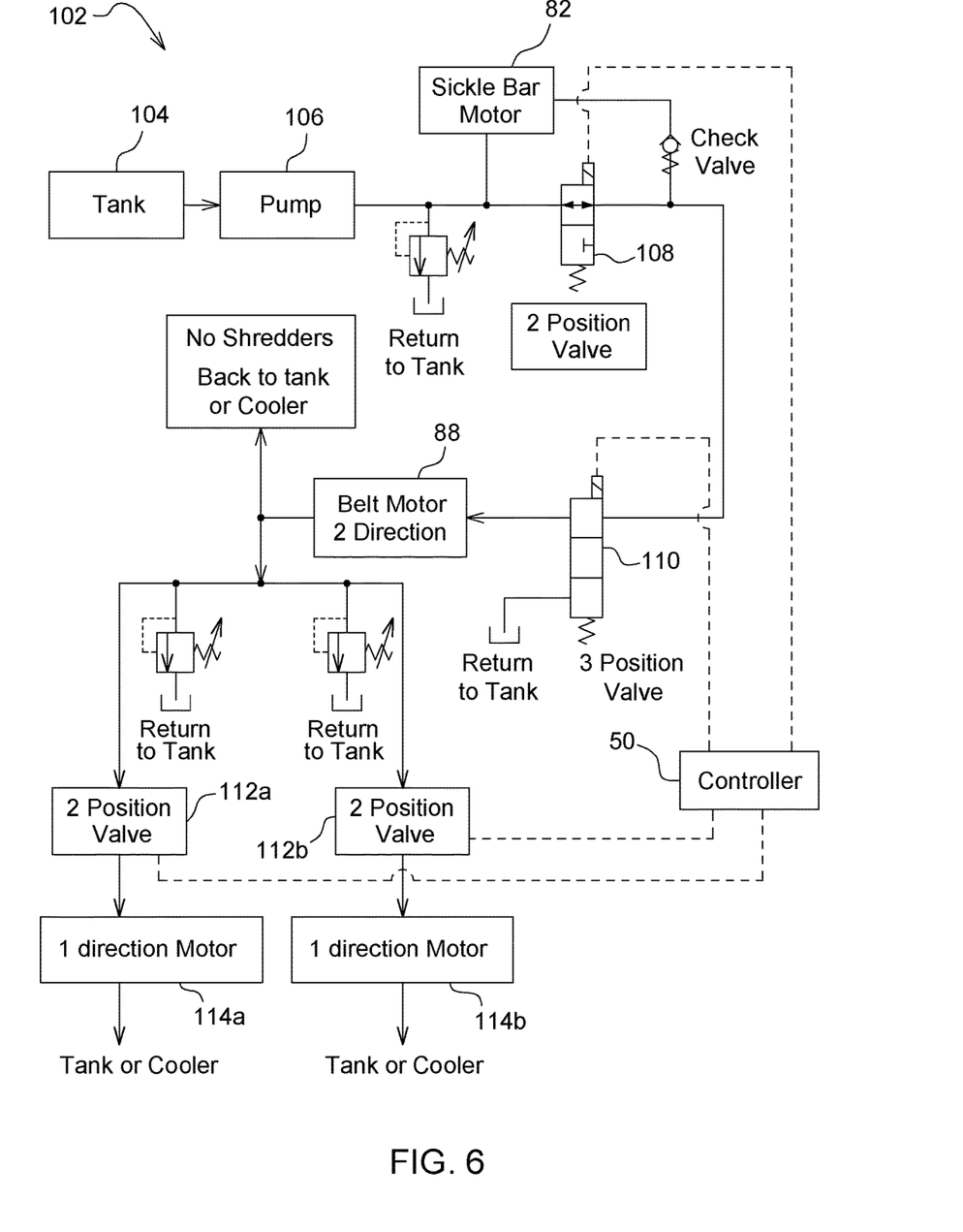
FIG. 6 is a block diagram illustrating a hydraulic circuit of the harvester of FIG. 1.

FIG. 6 illustrates a block diagram of at least a portion of a hydraulic circuit 102 for powering the topper 24 hydraulically. The hydraulic circuit 102 may also power other components of the harvester 10, such as the boom 26, the motor (not shown) for the separator 34, etc. The hydraulic circuit 102 includes a tank 104 providing a reservoir for a hydraulic fluid. The tank 102 is fluidly connected to a pump 106 for driving the fluid through the hydraulic circuit 102. For example, the fluid may selectively power the sickle bar motor 82 by way of a two-position valve 108 having a first position for turning the motor 82 off and a second position for turning the motor 82 on. For example, the valve 108 may be selectively opened or closed by the operator via the controller 50 to turn the motor 82 off and on. The pump 106 is also fluidly connected to the motor 88 for the conveyor 56. As such, the fluid may also selectively power the motor 88 by way of a three-position valve 110 movable between a first position for driving the conveyor 56 in the first direction, a second position for driving the conveyor 56 in the second direction, and a third position for turning the conveyor 56 drive off. The three-position valve 110 may be selectively moved between the first, second, and third positions by the operator via the controller 50 to operate the conveyor 56 in the first direction, the second direction, or turn the conveyor 56 drive off. If the topper 24 does not include the shredders 62, then the fluid may subsequently return to the tank 104. If the topper 24 includes one or more shredders 62, then the pump 106 may also be fluidly connected to drive the shredder(s) 62. Specifically, the fluid may power the shredder(s) 62 by way of a two-position valve 112a, 112b, respectively, having a first position for turning the shredder(s) 62 off and a second position for turning the shredder(s) 62 on. The valve 112a, 112b may be selectively opened or closed by the operator via the controller 50 to turn motors 114a, 114b off and on to selectively drive the shredder(s) 62. The hydraulic circuit 102 may include one valve to control all the shredders 62 simultaneously or may include a separate valve (e.g., 112a, 112b) for each shredder 62 to control each shredder 62 individually.

In operation, the topper 24 tops (or cuts) multiple rows of sugarcane, or other crop, at once. The "top" includes the upper, generally leafier portion of the crop. The operator may aim the topper 24 at the desired rows to be cut using the guide members 52 as a visual aide, as shown in FIG. 1, such that the at least one blade 70, e.g., the sickle bar, cuts tops off of the crop. The angle C of the cutter 54 with respect to the field 18 (or with respect to the crop) may be adjusted as necessary. When cut, the cut crop (i.e., the tops of the crop that are severed from the rooted crop stalks by the topper 24) falls onto the surface 92 of the conveyor 56, which is disposed at the angle D with respect to the cutter 54. The user may adjust the angle D to a desired angle for receiving the falling cut crop.

The rooted stalks are subsequently lifted by the crop lifters 22 and cut at the base (near the roots, or near the field 18) by the base cutter (not shown). The stalks thus enter the harvester 10 to be processed, e.g., cut into billets and cleaned. The extraneous crop matter separated in the separator 34 is ejected onto the field from the opening 40 in the hood 38, and cleaned crop is ejected from the discharge 44 into a collection vehicle. Thus, the harvester 10 has two outlets for processed crop.

The cut crop is relocated to a desired location by the conveyor 56. For example, when the belt 86 is driven in the first direction L, the cut crop is directed in the first direction L and ejected from the outlet 58 towards the field 18, and when the belt 86 is driven in the second direction R, the cut crop is directed in the second direction R and ejected from the outlet 60 towards the field 18. The direction of the conveyor 56 may be selected by the operator by way of the controller 50. For example, the operator may select a direction that ejects the cut crop towards an area of the field 18 that has already been harvested, which may change depending on the direction the harvester 10 is being driven. The crop cut by the topper 24 is ejected through the outlet(s) 58, 60 towards the field 18 externally of the harvester 10 and is not directed into the harvester 10, though it is conceivable that some of the cut crop may nevertheless make its way into the harvester 10 after it has landed on the field 18 or near the field 18. That is, the conveyor 56 is configured to direct the cut crop onto the field 18 directly, without first passing through the harvester 10 (e.g., without first passing through the chopper 32, the separator 34, etc.), preferably to a location where the cut crop will remain on the field 18 and return nutrients to the soil. Thus, the outlet(s) 58, 60 open to an exterior for ejecting the cut crop towards the field 18.

The cut crop may also be shredded by the one or more shredders 62. Further cutting the cut crop may be advantageous for field nutrient levels by accelerating reincorporation of the plant matter into the soil.

Thus, the disclosure provides, among other things, a harvester having a multi-row topper. Various features and advantages of the disclosure are set forth in the following claims.

What is claimed is:

1. A harvester comprising:
a main frame defining a front and a rear;
an inlet for receiving first portions of a crop, wherein the inlet is disposed proximate the front of the main frame;
a separator for processing the first portions;
at least one outlet downstream of the separator for ejecting the processed first portions;
a boom extending proximate the front of the main frame for reaching un-processed crop; and
a topper coupled to the boom for cutting second portions of the crop, the topper including
a cutter for cutting the second portions;
a first motor configured to drive the cutter;
a conveyor for receiving the second portions from the cutter;
an outlet disposed proximate the conveyor, wherein the conveyor is configured to transport the second portions towards the outlet for ejecting the second portions towards the field;
a shredder for shredding the second portions;
a second motor configured to drive the shredder; and
a hydraulic circuit configured to selectively activate the first and second motors.

2. The harvester of claim 1, wherein the conveyor includes a continuous belt.

3. The harvester of claim 1, wherein the cutter includes a sickle bar having reciprocating teeth.

4. The harvester of claim 1, wherein the outlet is a first outlet, wherein the harvester further comprises a second outlet disposed proximate the conveyor, and wherein the conveyor is selectively drivable in a first direction for directing the second portions of the crop towards the first outlet or a second direction for directing the second portions of the crop towards the second outlet.

5. The harvester of claim 1, wherein the topper further includes a frame supporting the cutter and the conveyor, wherein the outlet is defined by an opening in the frame.

6. The harvester of claim 1, wherein the outlet opens to an exterior for ejecting the second portions of the crop towards the field.

7. The harvester of claim 1, wherein the outlet opens laterally with respect to a direction of travel of the harvester during operation, and wherein the shredder is disposed proximate the outlet and configured to receive the second portions from the conveyor.

8. The harvester of claim 1, further comprising a hitch removably coupling the topper to the boom.

9. The harvester of claim 1, wherein an angle of the conveyor with respect to the cutter is adjustable.

10. The harvester of claim 4, wherein the shredder is a first shredder, the harvester further comprising a second shredder, wherein the first shredder is disposed proximate the first outlet and the second shredder is disposed proximate the second outlet.

11. A sugarcane harvester topper comprising:
a cutter for cutting the tops of the sugarcane;
a first motor configured to drive the cutter;
a conveyor for receiving the cut tops from the cutter;
an outlet disposed proximate the conveyor, wherein the conveyor is configured to transport the cut tops towards the outlet to eject the cut tops towards the field; and
a shredder configured to receive the cut tops from the conveyor, the shredder including at least one blade for shredding the cut tops;
a second motor configured to drive the shredder; and
a hydraulic circuit configured to selectively activate the first and second motors.

12. The harvester topper of claim 11, wherein the conveyor includes a continuous belt.

13. The harvester topper of claim 11, wherein the cutter includes at least one blade.

14. The harvester topper of claim 11, wherein the cutter includes a sickle bar having reciprocating teeth.

15. The harvester topper of claim 11, wherein the outlet is a first outlet, wherein the harvester topper further comprises a second outlet disposed proximate the conveyor.

16. The harvester topper of claim 11, further comprising a frame supporting the cutter and the conveyor, wherein the outlet is defined by an opening in the frame.

17. The harvester topper of claim 11, wherein the outlet opens to an exterior for ejecting the cut tops towards the field.

* * * * *